United States Patent
Hamano

(10) Patent No.: US 8,547,474 B2
(45) Date of Patent: Oct. 1, 2013

(54) IMAGE PICKUP APPARATUS AND CONTROL METHOD THEREOF

(75) Inventor: Hideyuki Hamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 12/822,549

(22) Filed: Jun. 24, 2010

(65) Prior Publication Data

US 2011/0001869 A1    Jan. 6, 2011

(30) Foreign Application Priority Data

Jul. 6, 2009    (JP) ................................ 2009-160185

(51) Int. Cl.
     *G03B 13/00*      (2006.01)

(52) U.S. Cl.
     USPC ........................................................ 348/349

(58) Field of Classification Search
     USPC ................. 348/362, 221.1, 208.99, 340, 248, 348/344, 208.11, 345–356
     See application file for complete search history.

(56) References Cited

U.S. PATENT DOCUMENTS

| | | | | |
|---|---|---|---|---|
| 4,717,959 A * | 1/1988 | Isago | .............................. | 348/351 |
| 4,772,909 A * | 9/1988 | Ogasawara | ................... | 396/136 |
| 7,711,259 B2 * | 5/2010 | Daley | .............................. | 396/89 |
| 7,747,159 B2 * | 6/2010 | Uenishi | ......................... | 396/135 |
| 2008/0013941 A1 * | 1/2008 | Daley | .............................. | 396/121 |

FOREIGN PATENT DOCUMENTS

| | | |
|---|---|---|
| JP | 2007-148242 A | 6/2007 |
| JP | 2008-046417 | 2/2008 |
| JP | 2008046417 A * | 2/2008 |

\* cited by examiner

*Primary Examiner* — Tuan Ho
*Assistant Examiner* — Ahmed A Berhan
(74) *Attorney, Agent, or Firm* — Cowan, Liebowitz & Latman, P.C.

(57) ABSTRACT

The image pickup apparatus is configured to move a focus lens and an image pickup element to perform focusing, the image pickup element being moved in a predetermined movable range. The image pickup apparatus includes a position detector configured to detect a position of the image pickup element moved for the focusing; and a controller configured to move, after the focusing, the image pickup element to a specific position closer to a center of the predetermined movable range than the position detected by the position detector and to move the focus lens so as to decrease generation of defocus due to the movement of the image pickup element to the specific position.

6 Claims, 8 Drawing Sheets

IMAGE PICKUP APPARATUS AND CONTROL METHOD THEREOF

BACKGROUND OF THE INVENTION

1. Field of the Invention

The present invention relates to an image pickup apparatus that performs focusing by moving a focus lens and an image pickup element.

2. Description of the Related Art

Image pickup apparatuses such as digital still cameras and video cameras generally detect a focus state of an image-taking optical system by a phase difference detection method or a contrast detection method to perform focusing by moving a focus lens included in the image-taking optical system on the basis of the detected focus state.

Japanese Patent Laid-Open No. 2008-046417 has disclosed an image pickup apparatus that performs focusing by moving an image pickup element which photoelectrically converts an object image in addition to movement of a focus lens. This image pickup apparatus first performs a high-speed movement (coarse pitch movement) of the focus lens to obtain a focus evaluation value in the contrast detection method, and then performs a minute movement (fine pitch movement) of the image pickup element to a position at which the focus evaluation value becomes a peak value. Such a focusing operation enables high-speed and highly accurate focusing.

However, the image pickup apparatus disclosed in Japanese Patent Laid-Open No. 2008-046417 may perform insufficient focusing since a movable range of the image pickup element is narrow with respect to that of the focus lens. For example, when performing image pickup of a moving object plural times continuously, a focusing operation including movements of the focus lens and the image pickup element is repeated to follow the moving object. In the repeated focusing operations, the image pickup element repeats movement to various positions and stoppage thereat in its movable range.

In a case where image pickup is performed in a state where the image pickup element is stopped at an end of the movable range in one direction, the image pickup element can be sufficiently moved for next image pickup from the stop position in a direction opposite to the one direction, but cannot be sufficiently moved in the one direction. Therefore, the movement of the image pickup element may not be able to be used for focusing for the next image pickup.

SUMMARY OF THE INVENTION

The present invention provides an image pickup apparatus capable of securing a sufficient movable range of an image pickup element for each focus operation when focusing is preformed by moving a focus lens and the image pickup element.

The present invention provides as an aspect thereof an image pickup apparatus configured to move a focus lens and an image pickup element to perform focusing, the image pickup element being moved in a predetermined movable range. The image pickup apparatus includes a position detector configured to detect a position of the image pickup element moved for the focusing, and a controller configured to move, after the focusing, the image pickup element to a specific position closer to a center of the predetermined movable range than the position detected by the position detector and to move the focus lens so as to decrease generation of defocus due to the movement of the image pickup element to the specific position.

The present invention provides as another aspect thereof a method for controlling an image pickup apparatus configured to move a focus lens and an image pickup element to perform focusing, the image pickup element being moved in a predetermined movable range. The method includes a step of detecting a position of the image pickup element moved for the focusing, and a step of moving, after the focusing, the image pickup element to a specific position closer to a center of the predetermined movable range than the detected position and moving the focus lens so as to decrease generation of defocus due to the movement of the image pickup element to the specific position.

Other aspects of the present invention will become apparent from the following description and the attached drawings.

DESCRIPTION OF THE PREFERRED EMBODIMENTS

Exemplary embodiments of the present invention will hereinafter be described with reference to the accompanying drawings.

Embodiment 1

Figure 1:
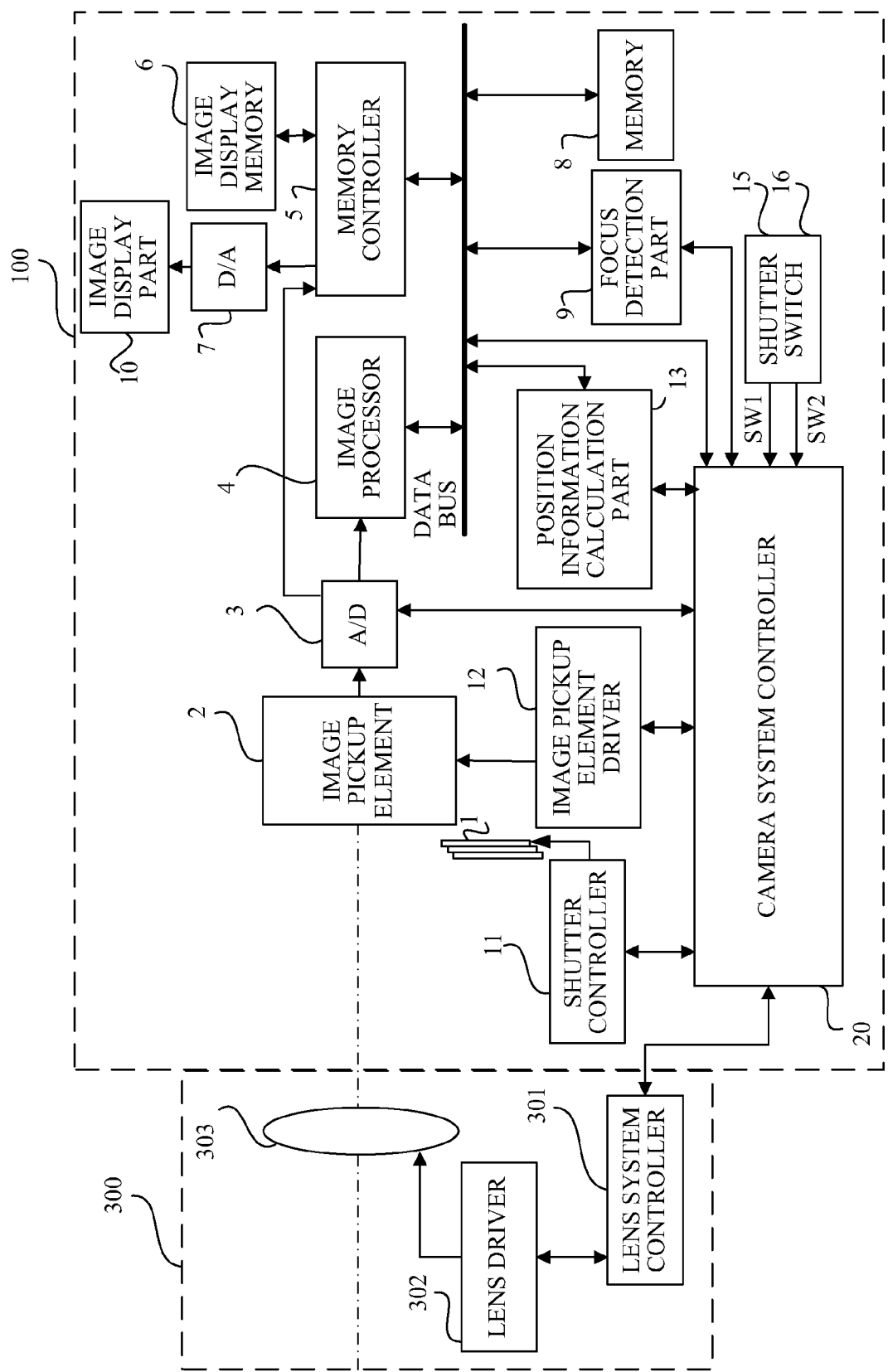
FIG. 1 is a block diagram showing a configuration of a camera system including a single-lens reflex digital camera that is Embodiment 1 of the present invention.

FIG. 1 shows a configuration of a camera system constituted by a single-lens reflex digital camera (image pickup apparatus) 100 that is a first embodiment (Embodiment 1) of the present invention and an interchangeable lens 300 detachably attached to the single-lens reflex digital camera 100. Although this embodiment will hereinafter describe a lens-interchangeable single-lens reflex digital camera, alternative embodiments of the present invention include other image pickup apparatuses such as a lens-integrated digital camera and a video camera.

In the single-lens reflex digital camera (hereinafter referred to as "camera") 100, reference numeral 2 denotes an image pickup element such as a CCD sensor or a CMOS sensor which photoelectrically converts an object image formed by an image-taking optical system (not shown) contained in the interchangeable lens 300. Reference numeral 1 denotes a shutter to control an exposure amount of the image pickup element 2. Reference numeral 3 denotes an A/D converter which converts an analog output signal from the image pickup element 2 into a digital signal (image data).

Reference numeral 4 denotes an image processor which performs image processing such as pixel interpolation processing, color conversion processing, white balance processing, gamma processing and AWB (auto white balance) processing on the image data from the A/D converter 3 to produce a displaying image and a recording image. The image processor 4 extracts high-frequency components as contrast information from the image data.

Reference numeral 20 denotes a camera system controller (controller) which controls various processing such as AF (autofocus) processing and AE (autoexposure) processing and various operations of the camera 100.

In the AF processing, the camera system controller 20 moves a focus lens 303 included in the image-taking optical system in an optical axis direction on the basis of a focus state detected by a focus detection part 9, which will be described later, through a lens system controller 301 and a lens driver 302 provided in the interchangeable lens 300. The camera system controller 20 moves in the same AF processing the image pickup element 2 in the optical axis direction on the basis of the focus state detected by the focus detection part 9 through an image pickup element driver 12, which will be described later.

In the AE processing, the camera system controller 20 controls a shutter 1 through a shutter controller 11 and controls an aperture stop (not shown) included in the image-taking optical system 303 through the lens system controller 301, on the basis of photometry information obtained from a photometry part (not shown).

Reference numeral 5 denotes a memory controller which controls the A/D converter 3, the image processor 4, an image display memory 6, a D/A converter 7 and a memory 8. The displaying image and the recording image produced by the image processor 4 are respectively stored in the image display memory 6 and the memory 8 through the memory controller 5.

The focus detection part 9 detects the focus state of the image-taking optical system by a contrast detection method using the contrast information extracted by the image processor 4. A method for detecting the focus state will be described later.

Reference numeral 10 denotes an image display part constituted by a display device such as a liquid crystal monitor. The displaying image stored in the image display memory 6 is displayed on the image display part 10 through the D/A converter 7. Displaying the displaying images (frame images constituting a moving image) sequentially produced by the image processor 4 on the image display part 10 at a predetermined cycle realizes an electronic viewfinder (live view image display) function.

In the memory 8, the recording image such as a still image and a moving image) is stored. Moreover, the memory 8 is used as a work area of the camera system controller 20.

The image pickup element driver 12 moves the image pickup element 2 in the optical axis direction in a predetermined movable range (hereinafter simply referred to as "movable range") with an actuator such as a stepping motor or a voice coil motor, based on an image pickup element control signal from the camera system controller 20.

Reference numeral 13 denotes a position information calculation part as a position detector which calculates (detects) position information of the image pickup element 2 being moved by the image pickup element driver 12. Specifically, the position information calculation part 13 accumulates a movement amount of the image pickup element 2 in a memory (not shown) at every movement of the image pickup element 2 through the image pickup element driver 12 to calculate the position information of the image pickup element 2 on the basis of a total of the accumulated movement amounts.

Reference numeral 15 denotes a first shutter switch (SW1) which is turned ON in response to a half push of a shutter button (not shown). The camera system controller 20 starts its operations such as the AF processing, the AE processing and the AWB processing in response to the turning ON of the first shutter switch (SW1) 15.

Reference numeral 16 denotes a second shutter switch (SW2) which is turned ON in response to a full push of the shutter button. The camera system controller 20 performs image pickup processing including exposure of the image pickup element 2 for acquiring the recording image, producing of the recording image by the image processor 4, and recording of the recording image to the memory 8, in response to the turning ON of the second shutter switch (SW2) 16.

In the interchangeable lens 300, the lens driver 302 moves the focus lens 303 included in the image-taking optical system in the optical axis direction with an actuator such as a stepping motor or a voice coil motor.

The lens system controller 301 causes the lens driver 302 to move the focus lens 303 in the optical axis direction and drives the aperture stop according to a focus control signal and an aperture stop control signal from the camera system controller 20.

Next, description will be made of the operations of the camera 100 (mainly, of the camera system controller 20). First of all, description will be made of operations relating to the AF processing and the image pickup processing with reference to a flowchart shown in FIG. 2.

At step S1, the camera system controller 20 starts live view image display in response to turning ON of a power switch (not shown).

Next at step S2, the camera system controller 20 determines whether or not the first shutter switch SW1 is turned ON. The camera system controller 20 proceeds to step S3 to perform the AF processing if the first shutter switch SW1 is turned ON, and then proceeds to step S4. Details of the AF processing will be described later. The camera system controller 20 repeats step S2 if the first shutter switch SW1 is not turned ON.

At step S4, the camera system controller 20 performs the AE processing and causes the image processor 4 to perform the AWB processing.

Next at step S5, the camera system controller 20 determines whether or not the second shutter switch SW2 is turned ON. The camera system controller 20 proceeds to step S6 if the second shutter switch SW2 is turned ON, and repeats steps S2 to S5 if the second shutter switch SW2 is not turned ON.

At step S6, the camera system controller 20 stops the live view image display. Then, at step S7, the camera system controller 20 opens the shutter 1 through the shutter controller 11 to start the exposure of the image pickup element 2. After finishing the exposure of the image pickup element 2 for a predetermined time, the camera system controller 20 at step S8 shuts the shutter 1 through the shutter controller 11.

After the shutter 1 has been shut at step S8, the camera system controller 20 at step S9 causes the A/D converter 3 to generate the image data from the analog output signal of the image pickup element 2. Then, the camera system controller 20 at step S10 causes the image processor 4 to produce the recording image. Moreover, at step S11, the camera system controller 20 causes the image processor 4 to send the recording image to the memory controller 5 and causes the memory controller 5 to store the recording image in the memory 8.

Furthermore, in parallel with steps S9 to S11, the camera system controller 20 at step S101 performs processing for correcting positions of the focus lens 303 and the image pickup element 2 in the optical axis direction (hereinafter, this processing is referred to as "position correction processing"). Details of the position correction processing will be described later.

After finishing the steps S11 and S101, the camera system controller 20 returns to step S1 to restart the live view image display.

Figure 2:
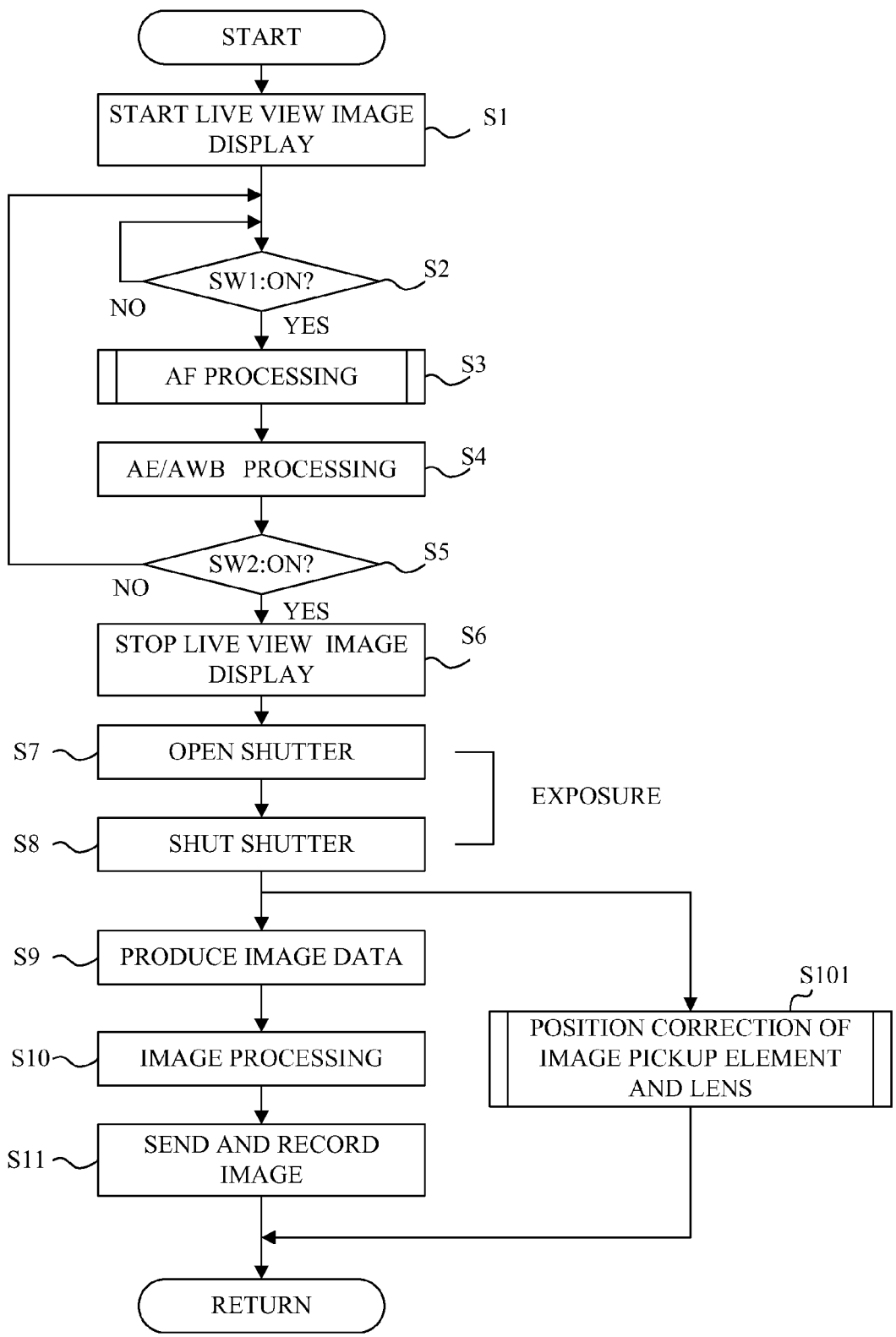
FIG. 2 is a flowchart showing AF processing and image pickup processing performed by the camera of Embodiment 1.

The image pickup processing shown by the flowchart of FIG. 2 performs single image pickup, and therefore the camera system controller 20 returns from steps S11 and S10 to step S1 to restart the live view image display. However, in a case the image pickup processing performs continuous image pickup (that is, in a case where the image pickup processing performs image pickup plural times continuously), the camera system controller 20 returns from steps S11 and S10 to step S3 to perform the AF processing for next image pickup.

As described above, in this embodiment, the position correction processing is performed (step S101) while the exposure of the image pickup element 2, the generating of the image data, the producing of the recording image and the sending and recording of the recording image are performed (steps S9 to S11). Therefore, the position correction processing can be performed without influencing the image pickup processing.

Next, description will be made of the details of the AF processing performed at step S3 in FIG. 2 with reference to a flowchart shown in FIG. 3.

At step S201, the camera system controller 20 starts the exposure of the image pickup element 2 to acquire information necessary for focus detection by the contrast detection method.

Next at step S202, the camera system controller 20 moves the focus lens 303 from an infinite distance end toward a close distance end by a first predetermined amount through the lens system controller 301. The focus lens 303, however, may be moved from the close distance end toward the infinite distance end.

Next at step S203, after the focus lens 303 has been moved by the first predetermined amount, the camera system controller 20 causes the image processor 4 to extract the contrast information from the image data.

Next at step S204, the camera system controller 20 causes the focus detection part 9 to calculate the AF evaluation value from the contrast information, and then determines whether or not detection of a peak of the AF evaluation value has been made. If the detection of the peak has been made, the camera system controller 20 returns to step S202 to move the focus lens 303 again by the first predetermined amount, and then causes the image processor 4 and the focus detection part 9 to extract the contrast information and calculate the AF evaluation value at steps S203 and S204.

Figure 4A:
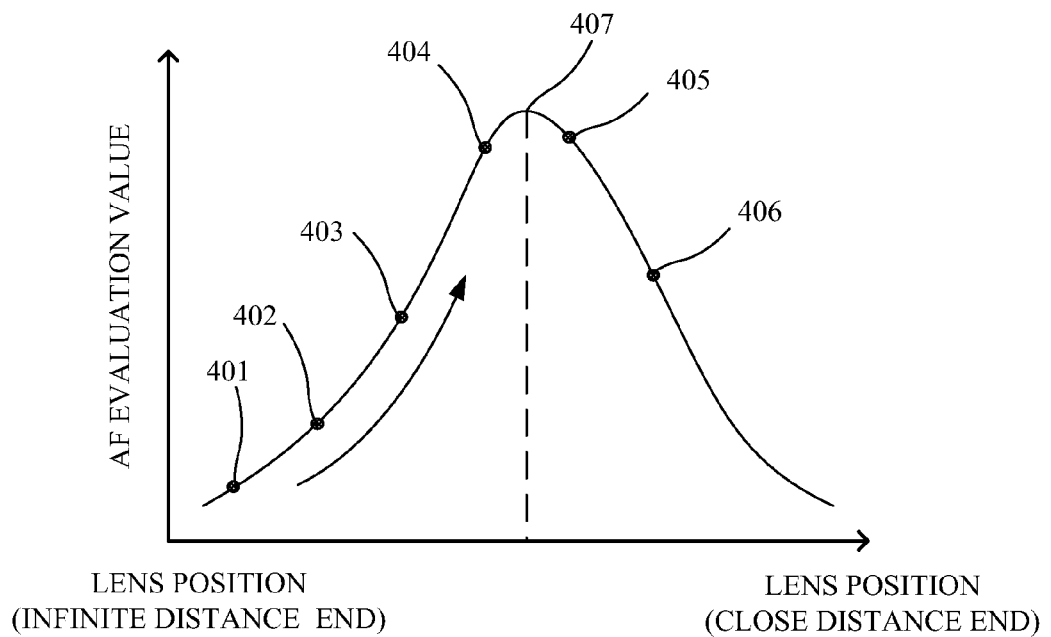
FIG. 4A shows a relationship between a position of a focus lens and an AF evaluation value in the camera of Embodiment 1.

Description will be made of detection processing of the peak of the AF evaluation value by the movement of the focus lens 303 with reference to FIG. 4A. FIG. 4A shows a relationship between the position of the focus lens shown along a horizontal axis and the AF evaluation value shown along a vertical axis. Specifically, FIG. 4A shows that, in a case where the focus lens 303 is moved from the infinite distance end toward the close distance end in steps of the first predetermined amount, the AF evaluation value calculated after each movement of the first predetermined amount is changed from a value 401 to a value 406.

The AF evaluation value increases from the value 401 to the value 404 as contrast of the image data increases with the movement of the focus lens 303. When the focus lens 303 passes a position corresponding to a maximum (peak) value 407 of the AF evaluation value (hereinafter referred to as "peak AF evaluation value 407"), the AF evaluation value turns to decrease to the values 405 and 406. Therefore, it is understood that the peak AF evaluation value 407 exists in a range where the AF evaluation value turns from increase to decrease. The position of the focus lens 303 corresponding to the peak AF evaluation value 407 (this position is hereinafter referred to as "peak position") is a position where a near in-focus state can be obtained.

However, in the detection processing of the peak AF evaluation value 407, since a priority is put on detection of the peak position in a shortest possible time, the first predetermined amount that is a unit movement amount of the focus lens 303 by the actuator is set to a certain large amount. Thus, it is impossible to accurately determine which focus lens position is an actual focus lens position (in-focus position) corresponding to the peak AF evaluation value 407 between two focus lens positions where the AF evaluation values 404 and 405 are calculated.

Therefore, when the peak AF evaluation value has been detected at step S204, the camera system controller 20 proceeds to step S205 to start to move the image pickup element 2 in a direction in which the AF evaluation value approaches the peak AF evaluation value 407 detected at step S204 through the image-pickup element driver 12.

The image pickup element 2 is moved in steps of a second predetermined amount smaller than the first predetermined amount that is the unit movement amount of the focus lens 303 as described above. Moving the image pickup element 2 in steps of the second predetermined amount enables achievement of a more highly accurate in-focus state as compared with a case of moving the focus lens 303 in steps of the first predetermined amount. This effect will be described later.

The image pickup element 2 is located at a central area of its movable range before it is moved. The movement amounts of the image pickup element 2 after start of its movement are accumulated by the position information calculation part 13.

The "central area" of the movable range includes not only a strict central position but also positions near the strict central position. In other words, it is only necessary that the "central area" be a position where approximately same movable amounts of the image pickup element 2 sufficient to detect a peak of the AF evaluation value by the movement of the image pickup element 2 can be secured in front and rear directions (that is, on an object side and a side opposite thereto) from the image pickup element 2. The same is applied to the following description.

At step S206, the camera system controller 20 stops the movement of the image pickup element 2 after the image pickup element 2 has been moved by the second predetermined amount, and then performs the exposure of the image pickup element 2. Then, the camera system controller 20 causes the image processor 4 to extract the contrast information of the image data obtained by the exposure.

Next at step S207, the camera system controller 20 causes the focus detection part 9 to calculate the AF evaluation value from the contrast information, and then determines whether or not a peak of the AF evaluation value has been detected. If the peak of the AF evaluation value has not been detected, the camera system controller 20 returns to step S205 to move the image pickup element 2 again by the second predetermined amount, and further causes the image processor 4 to extract the contrast information and causes the focus detection part 9 to calculate the AF evaluation value at steps S206 and S207.

Figure 4B:
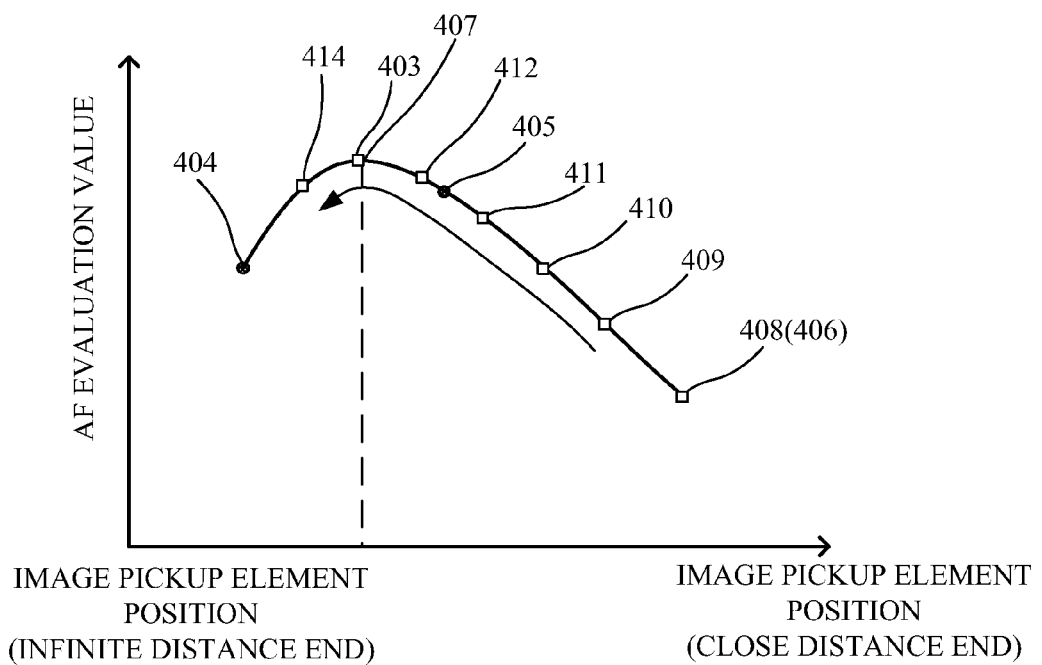
FIG. 4B shows a relationship between a position of an image pickup element and the AF evaluation value in the camera of Embodiment 1.

Description will be made of detection processing of the peak of the AF evaluation value by the movement of the image pickup element 2 with reference to FIG. 4B. FIG. 4B shows a relationship between the position of the image pickup element 2 shown along a horizontal axis and the AF evaluation value shown along a vertical axis. Specifically, FIG. 4B shows that, in a case where the image pickup element 2 is moved from a position closer to the close distance end than a position corresponding to the peak AF evaluation value 407 shown in FIG. 4A toward the infinite distance end in steps of the second predetermined amount, the AF evaluation value calculated after each movement of the second predetermined amount is changed from a value 409 to a value 414. A value 413 is a peak value of the AF evaluation value (hereinafter referred to as "peak AF evaluation value").

Using the AF evaluation value 406 shown in FIG. 4A as an AF evaluation value 408 at a start of the movement of the image pickup element 2 from the central area of the movable range makes it possible to determine whether or not an AF evaluation value 409 subsequently calculated is increased or decreased with respect to the AF evaluation value 408 at the start of the movement of the image pickup element 2.

The AF evaluation value increases from the value 409 to the value 412 as the contrast of the image data increases with the movement of the image pickup element 2. When the image pickup element 2 passes a position corresponding to the peak AF evaluation value 413, the AF evaluation value turns to decrease to the value 414. Therefore, it is understood that the peak AF evaluation value 413 exists in a range where the AF evaluation value turns from increase to decrease. Since the second predetermined amount which is a unit movement amount of the image pickup element 2 is smaller than the first predetermined amount which is the unit movement amount of the focus lens 303 as described above, the calculated peak AF evaluation value 413 is almost equal to an AF evaluation value showing an actual in-focus state. Therefore, the position of the image pickup element 2 corresponding to the peak AF evaluation value 413 is an almost accurate in-focus position, and thereby a more accurate in-focus state can be obtained than the case where the in-focus position is determined based on the peak AF evaluation value detected by the movement of the focus lens 303.

At step S207, when the detection of the peak AF evaluation value has been made, the camera system controller 20 proceeds to step S208. At step S208, the camera system controller 20 moves the image pickup element 2 in a direction reverse to the previous direction by the second predetermined amount from the position at which the AF evaluation value 414 after the turning of the AF evaluation value from increase to decrease has been calculated. As a result, the image pickup element 2 can be moved to the position corresponding to the peak AF evaluation value 413.

Next, at step S209, the camera system controller 20 causes the position information calculation part 13 to calculate the position information showing a current position of the image pickup element 2 from the accumulated movement amount of the image pickup element 2. The camera system controller 20 stores the position information calculated by the position information calculation part 13 as first position information, and then ends the AF processing.

Next, description will be made of the position correction processing of the image pickup element 2 and the focus lens 303 performed at step S101 shown in FIG. 2 after the AF processing (after focusing) described above, with reference to a flowchart shown in FIG. 5.

At step S301, the camera system controller 20 acquires the position information of the image pickup element 2 calculated by the position information calculation part 13. Then, the camera system controller 20 moves (returns) the image pickup element 2 to the central area (specific position) of the movable range on the basis of the position information. In other words, the camera system controller 20 calculates a movement amount of the image pickup element 2 to return it from the position corresponding to the acquired position information to the specific position which is closer to a center of the movable range than the position corresponding to the acquired position information. The position corresponding to the acquired position information is the position to which the image pickup element 2 has been moved in the AF processing.

The movement amount for returning the image pickup element 2 to the central area of the movable range is hereinafter referred to as "returning amount", and the movement for returning the image pickup element 2 to the central area of the movable range is hereinafter referred to as "returning movement".

In addition, the camera system controller 20 calculates an amount of defocus caused due to the returning movement of the image pickup element 2 by the returning amount to the central area of the movable range. Then, the camera system controller 20 calculates the movement amount of the focus lens 303 (hereinafter referred to as "focus correction amount") to obtain an in-focus state by decreasing (correcting) the defocus. This movement of the focus lens 303 is hereinafter referred to as "correction movement" of the focus lens 303.

Next at step S302, the camera system controller 20 performs the returning movement of the image pickup element 2 by the returning amount calculated at step S301 through the image pickup element driver 12 to return the image pickup element 2 to the central area of the movable range.

Further, at step S303, the camera system controller 20 performs the correction movement of the focus lens 303 by the focus correction amount calculated at step S301 through the lens system controller 301. In this correction movement, the camera system controller 20 moves the focus lens 303 by a unit movement amount (third predetermined amount) smaller than the unit movement amount (first predetermined amount) of the focus lens 303 in the AF processing. This makes it possible to sufficiently correct (reduce) the defocus generated by the returning movement of the image pickup element 2 performed at step S302, and thereby an in-focus state can be obtained again. Therefore, displaying of a largely defocused live view image can be avoided when the displaying of the live view image is restarted after the image processing has been ended.

Finally, at step S304, the camera system controller 20 resets the position information of the image pickup element 2 acquired from the position information calculation part 13 to 0. The reset makes it possible to cause the accumulation of the movement amount of the image pickup element 2 in the AF processing for next image pickup to start from 0. Then, the camera system controller 20 ends the position correction processing of the image pickup element 2 and the focus lens 303.

Next, description will be made of reasons to perform the position correction processing of the image pickup element 2 and the focus lens 303 with reference to FIGS. 6A to 6E. In FIGS. 6A to 6E, reference numeral 502 denotes the movable range in the optical axis direction of the image pickup element 2 being moved by the image pickup element driver 12.

Figure 6A:
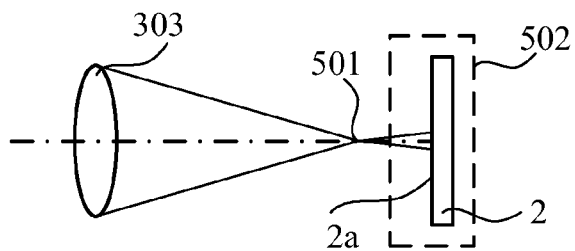
FIGS. 6A to 6E show positional relationships of the focus lens and the image pickup element in Embodiment 1.

FIG. 6A shows a state before the AF processing is started at step S3 shown in FIG. 2, that is, a state where the AF evaluation value 401 shown in FIG. 4A is obtained. A focal point 501 of the image-taking optical system determined by the position of the focus lens 303 is located further on a front side (object side) than an image pickup surface 2a of the image pickup element 2 located in the central area of the movable range 502, and therefore a defocused object image is formed on the image pickup surface 2a.

Figure 6B:
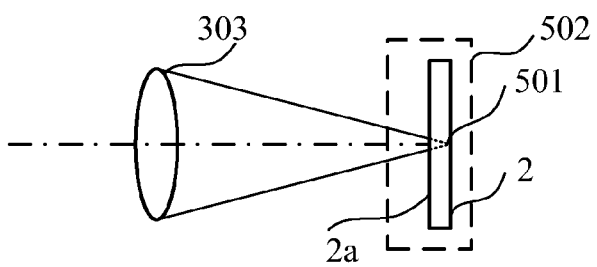

FIG. 6B shows a state where the AF processing has been started and thereby the focus lens 303 has been moved to the position corresponds to the peak AF evaluation value 407 shown in FIG. 4A. The focal point 501 of the image-taking optical system is located slightly rearward with respect to the image pickup surface 2a of the image pickup element 2 located in the central area of the movable range 502. In this state, an object image which is approximately focused but strictly defocused is formed on the image pickup surface 2a.

Figure 6C:
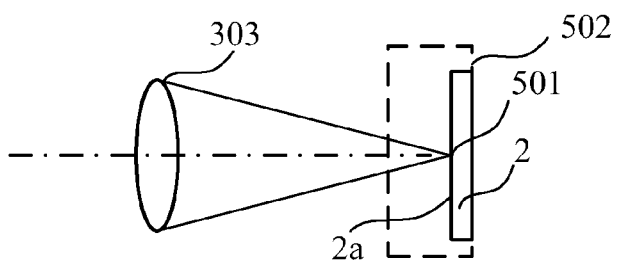

FIG. 6C shows a state where the image pickup element 2 has been moved to an in-focus position, that is, a state where the AF processing performed at step S3 shown in FIG. 2 has been ended. The focal point 501 of the image-taking optical system is coincided with the image pickup surface 2a of the image pickup element 2 moved to a position near a rear end of the movable range 502. In other words, a highly accurate in-focus state is obtained.

It is possible to start the image pickup processing from the state shown in FIG. 6C. However, in a case where the AF processing for next image pickup is performed at once, a sufficient movable amount of the image pickup element 2 in the rear direction cannot be secured. Therefore, the above-described position correction processing of the image pickup element 2 and the focus lens 303 should be performed.

Figure 5:
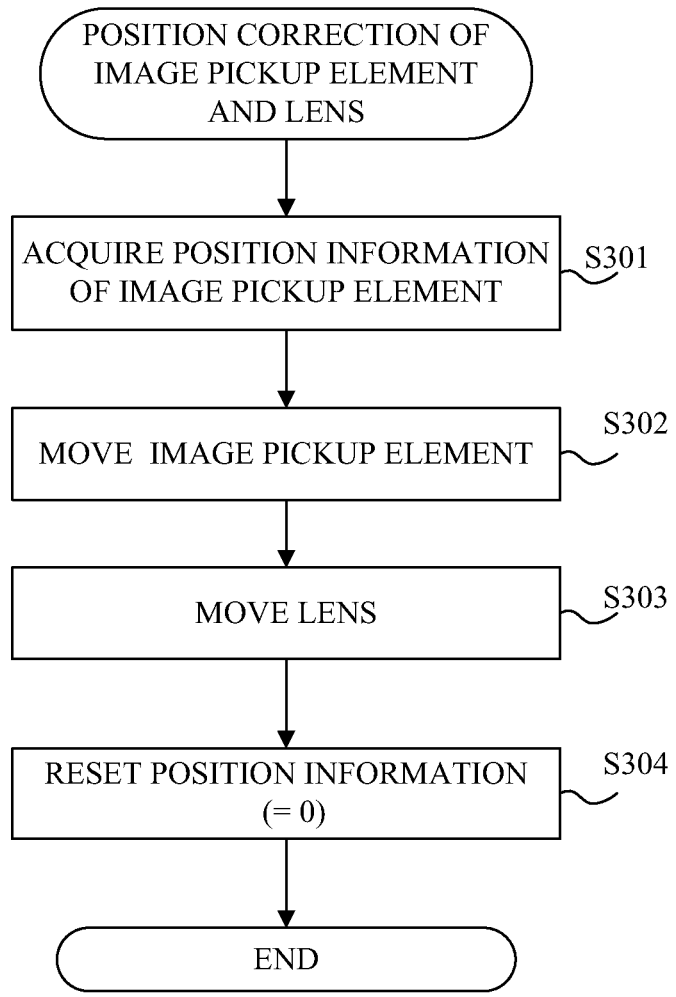
FIG. 5 is a flowchart showing position correction processing of the image pickup element and the focus lens performed in the camera of Embodiment 1.
Figure 6D:
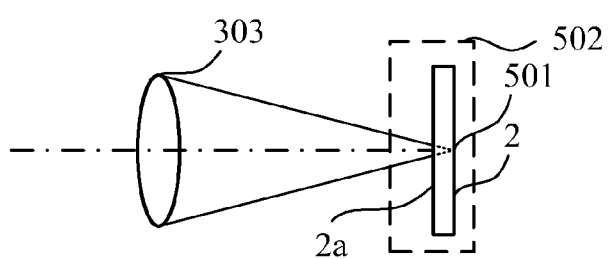

FIG. 6D shows a state after the returning movement of the image pickup element 2 has been performed at step S302 shown in FIG. 5. The image pickup element 2 has been returned from the position shown in FIG. 6C to the central area of the movable range 502. As a result, even in the case where the AF processing for the next image pickup is performed at once, a sufficient movable amount of the image pickup element 2 in the front and rear directions can be secured. However, as a result that the image pickup element 2 is returned to the central area of the movable range 502, the focal point 501 of the image-taking optical system is moved rearward with respect to the image pickup surface 2a of the image pickup element 2, which causes defocus in the object image formed on the image pickup surface 2a.

Figure 6E:
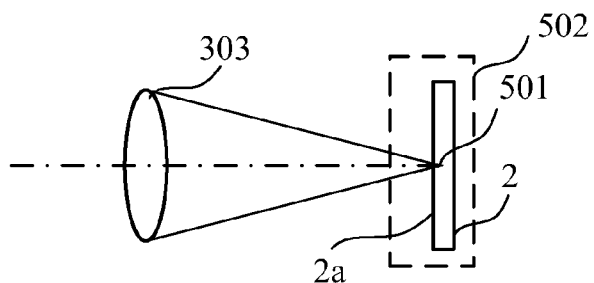

FIG. 6E shows a state after the correction movement of the focus lens 303 has been performed at step S303 shown in FIG. 5. The correction movement causes the focal point 501 of the image-taking optical system to approximately coincide with the image pickup surface 2a of the image pickup element 2 located in the central area of the movable range 502, and thereby an in-focus state is obtained again. Since the correction movement of the focus lens 303 is performed with the smaller unit movement amount (third predetermined amount) than that of the AF processing as described above, a degree of coincidence of the focal point 501 with the image pickup surface 2a can be improved.

At step S301 described above, calculating the returning amount of the image pickup element 2 in accordance with a minimum unit movement amount (for example, the third predetermined amount) of the focus lens 303 makes it possible to cause the focal point 501 to more accurately coincide with the image pickup surface 2a.

As described above, this embodiment moves the image pickup element 2 to the central area of the movable range (that is, the position closer to the center of the movable range than the position calculated by the position information calculation part 13) after the focus lens 303 and the image pickup element 2 have been moved in the AF processing. Therefore, a sufficient movable amount of the image pickup element 2 in the AF processing for the next image pickup can be secured in the front and rear directions, which enables acquisition of a highly accurate in-focus state in the AF processing.

Moreover, this embodiment also moves the focus lens 303 to correct (decrease) the defocus caused due to the returning movement of the image pickup element 2, which enables avoidance of generation of a largely defocused state. Therefore, displaying of a largely defocused live view image can be avoided when the displaying of the live view image is restarted after the stoppage thereof.

Although the embodiment has described the case where the position correction processing of the image pickup element and the focus lens is performed after each image pickup processing, it is not necessarily needed to perform the position correction processing after each image pickup processing. For example, the position correction processing of the image pickup element and the focus lens may be performed after every multiple AF processing. This makes it possible to always perform highly accurate focusing regardless of the image pickup processing.

Furthermore, although this embodiment has described the case where, in the AF processing, the image pickup element is moved after the detection processing of the peak AF evaluation value has been performed by moving the focus lens, it is not necessarily needed to move the image pickup element after the peak detection processing has been performed by moving the focus lens. For example, determination that the focus lens is located close to the position where the peak AF evaluation value can be obtained may be made when a change amount of the AF evaluation value for each movement of the focus lens becomes smaller than a predetermined value, and then the movement of the image pickup element may be performed. This makes it possible to obtain an in-focus state in a shorter time.

Moreover, although this embodiment has described the case where the focus detection is performed by the contrast detection method, other focus detection methods can be used, for example, a phase difference detection method. In the phase difference detection method, a configuration may be employed in which a light flux transmitted through the image-taking optical system is divided by an optical element such as a pellicle mirror, and the divided light fluxes are introduced to the image pickup element and a phase difference detecting sensor provided separately from the image pickup element.

Moreover, a phase difference detection method using pixels of the image pickup element may be used. In addition, the focus detection may be performed by combining the contrast detection method using the image pickup element and the phase difference detection method using the phase difference detecting sensor provided separately from the image pickup element.

Embodiment 2

Figure 7:
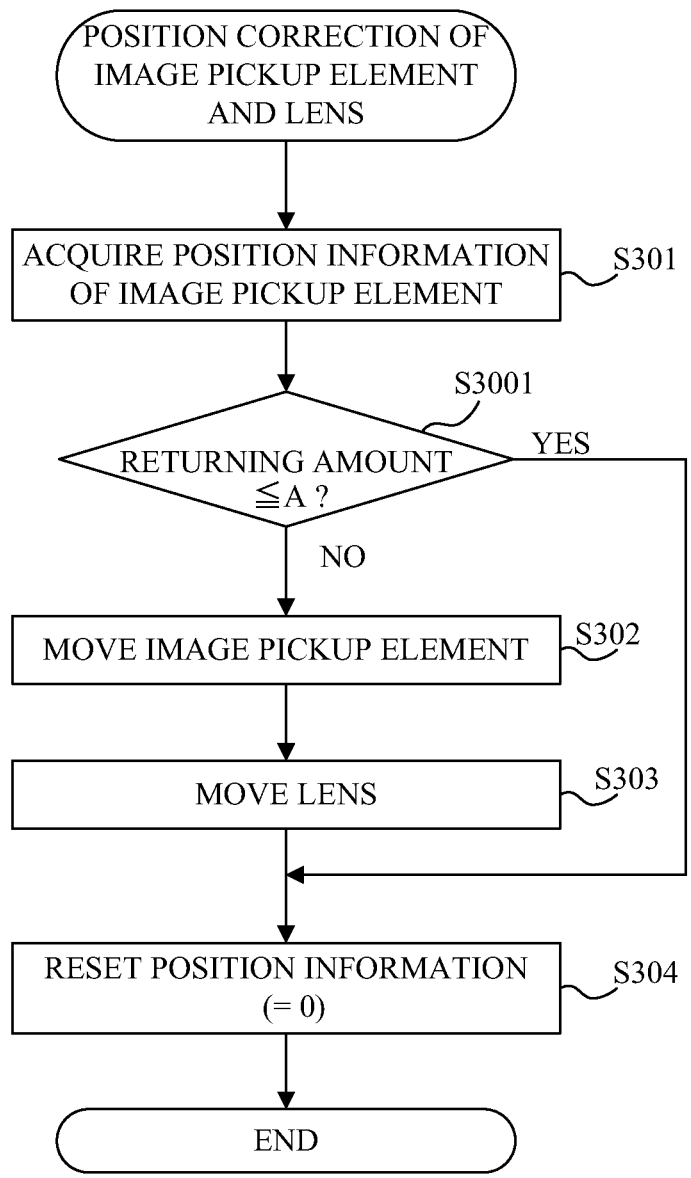
FIG. 7 is a flowchart showing position correction processing of an image pickup element and a focus lens performed in a single-lens reflex digital camera that is Embodiment 2 of the present invention.

FIG. 7 shows position correction processing of an image pickup element and a focus lens in a single-lens reflex digital camera that is a second embodiment (Embodiment 2) of the present invention. This embodiment allows faster repetition of AF processing as compared with Embodiment 1 without performing an unnecessary returning movement of the image pickup element and an unnecessary correction movement of the focus lens.

Figure 3:
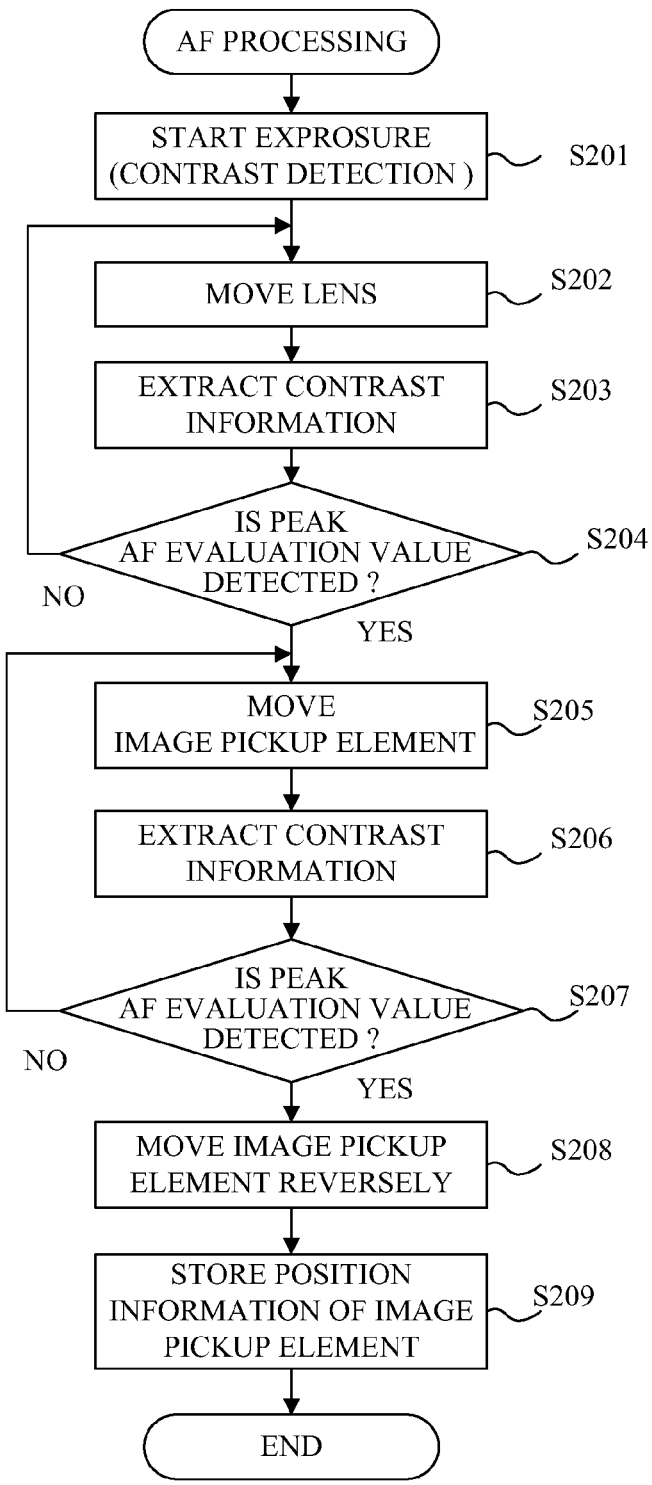
FIG. 3 is a flowchart showing the AF processing performed by the camera of Embodiment 1.

The configuration of the camera system shown in FIG. 1 and the operations relating to the AF processing and the image pickup processing shown in FIGS. 2 and 3 in Embodiment 1 are the same as those of this embodiment.

The position correction processing of the image pickup element 2 and the focus lens 303 shown in FIG. 7 is also performed at step S101 shown in FIG. 2.

At step S301, the camera system controller 20 acquires the position information of the image pickup element 2 calculated in the position information calculation part 13 as described in Embodiment 1. The camera system controller 20 calculates the returning amount of the image pickup element 2 on the basis of the position information of the image pickup element 2, and calculates the focus correction amount.

Next at step S3001, the camera system controller 20 determines whether or not the returning amount of the image pickup element 2 calculated at step S301 is equal to or smaller than a predetermined threshold value (first predetermined value) A. If the returning amount is equal to or smaller than the threshold value A, the camera system controller 20 proceeds to step S304 without performing the returning movement of the image pickup element 2. On the other hand, if the returning amount is larger than the threshold value A, the camera system controller 20 proceeds to step S302 to perform the returning movement of the image pickup element 2.

Thus, this embodiment restricts the returning movement of the image pickup element 2 when the calculated returning amount of the image pickup element 2 is equal to or smaller than the threshold value A (or the calculated returning amount is smaller than the threshold value A). This is because a sufficient movable amount of the image pickup element 2 in the AF processing for the next image pickup in the front and rear directions is secured in the movable range of the image pickup element 2. As a result, an unnecessary returning movement of the image pickup element 2 and further an unnecessary correction movement of the focus lens 303 associated therewith can be eliminated, and therefore the AF processing for the next image pickup can be started quickly. Moreover, the elimination of the unnecessary returning and correction movements enables power saving of the camera system.

At step S302 and step S303, the camera system controller 20 performs, as described in Embodiment 1, the returning movement of the image pickup element 2 by the returning amount calculated at step S301, and performs the correction movement of the focus lens 303 by the focus correction amount calculated at the same step.

Next at step S304, the camera system controller 20 resets the position information of the image pickup element 2 acquired from the position information calculation part 13 to 0 as described in Embodiment 1.

Embodiment 3

Figure 8:
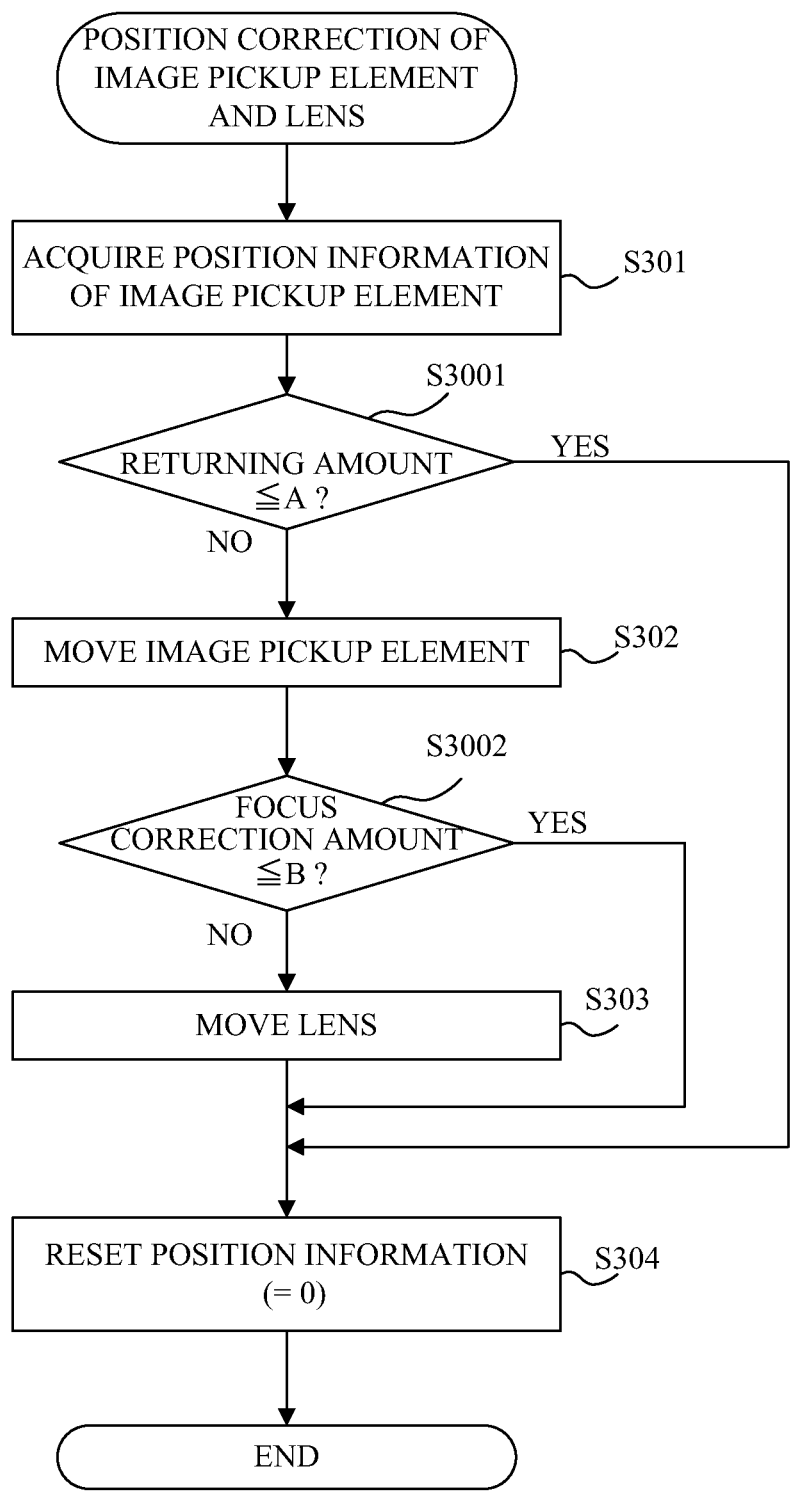
FIG. 8 is a flowchart showing position correction processing of an image pickup element and a focus lens performed in a single-lens reflex digital camera that is Embodiment 3 of the present invention.

FIG. 8 shows position correction processing of an image pickup element and a focus lens in a single-lens reflex digital camera that is a third embodiment (Embodiment 3) of the present invention. This embodiment allows further faster repetition of AF processing as compared with Embodiment 2.

The configuration of the camera system shown in FIG. 1 and the operations relating to the AF processing and the image pickup processing shown in FIGS. 2 and 3 in Embodiment 1 are the same as those of this embodiment.

The position correction processing of the image pickup element 2 and the focus lens 303 shown in FIG. 8 is also performed at step S101 shown in FIG. 2.

At step S301, the camera system controller 20 acquires the position information of the image pickup element 2 calculated in the position information calculation part 13 as described in Embodiment 1. The camera system controller 20 calculates the returning amount of the image pickup element 2 on the basis of the position information of the image pickup element 2, and calculates the focus correction amount.

Next at step S3001, the camera system controller 20 determines, as described in Embodiment 2, whether or not the returning amount of the image pickup element 2 calculated at step S301 is equal to or smaller than a predetermined threshold value A. If the returning amount is equal to or smaller than the threshold value A, the camera system controller 20 proceeds to step S304 without performing the returning movement of the image pickup element 2. On the other hand, if the returning amount is larger than the threshold value A, the camera system controller 20 proceeds to step S302 to perform the returning movement of the image pickup element 2.

At step S302, the camera system controller 20 performs, as described in Embodiment 1, the returning movement of the image pickup element 2 by the returning amount calculated at step S301.

Next at step S3002, the camera system controller 20 determines whether or not the focus correction amount calculated at step S301 is equal to or smaller than a predetermined threshold value (second predetermined value) B. If the focus correction amount is equal to or smaller than the threshold value B, the camera system controller 20 proceeds to step S304 without performing the correction movement of the focus lens 303. On the other hand, if the focus correction amount is larger than the threshold value B, the camera system controller 20 proceeds to step S303.

Description will be made of the threshold value B. When the focus correction amount is larger than the minimum unit movement amount of the focus lens 303, the correction movement of the focus lens 303 can well correct the defocus caused due to the returning movement of the image pickup element 2.

On the other hand, when the focus correction amount is smaller than the minimum unit movement amount of the focus lens 303, even if the focus lens 303 is moved by the minimum unit movement amount, the focus lens 303 passes a position at which the defocus caused due to the returning movement of the image pickup element 2 can be best corrected. The position at which the defocus can be best corrected is hereinafter referred to as "best correction position".

When a difference between a position of the focus lens 303 after the correction movement has been performed and the best correction position becomes smaller than a difference between a position of the focus lens 303 before the correction movement is performed and the best correction position, the defocus can be reduced by the correction movement of the focus lens 303.

For this reason, if the minimum unit movement amount of the focus lens 303 is smaller than twice the focus correction amount, a defocus decreasing effect can be obtained by the correction movement of the focus lens 303. Therefore, it is desirable that the threshold value B be set to twice the minimum unit movement amount of the focus lens 303. However, this is only an example, and the threshold value B can be arbitrarily set.

Thus, this embodiment restricts the correction movement of the focus lens 303 when the focus correction amount is equal to or smaller than the threshold value B (or the focus correction amount is smaller than the threshold value B) even in the case where the returning movement of the image pickup element 2 has been performed. This makes it possible to eliminate an unnecessary correction movement of the focus lens 303, and therefore the AF processing for the next image pickup can be started quickly. Moreover, the elimination of the unnecessary correction movement enables power saving of the camera system.

At step S303, the camera system controller 20 performs, as described in Embodiment 1, the correction movement of the focus lens 303 by the focus correction amount calculated at step S301.

Next at step S304, the camera system controller 20 resets, as described in Embodiment 1, the position information of the image pickup element 2 acquired from the position information calculation part 13 to 0.

According to the above-described embodiments, the returning movement of the image pickup element to the specific position after the focusing (AF) can secure a sufficient movable amount of the image pickup element for performing subsequent focusing. Moreover, the correction movement of the focus lens to decrease the defocus caused due to the returning movement of the image pickup element to the specific position can avoid the generation of a large defocused state caused due to the returning movement.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims the benefit of Japanese Patent Application No. 2009-160185, filed on Jul. 6, 2009, which is hereby incorporated by reference herein in its entirety.

What is claimed is:

1. An image pickup apparatus configured to move a focus lens and an image pickup element to perform focusing, the image pickup element being moved in a predetermined movable range, the image pickup apparatus comprising:
   a position detector configured to detect a position of the image pickup element moved for the focusing; and
   a controller configured to move, after the focusing, the image pickup element to a specific position closer to a center of the predetermined movable range than the position detected by the position detector, and to subsequently move the focus lens so as to decrease generation of defocus due to the movement of the image pickup element to the specific position,
   wherein in a correction movement so as to decrease generation of defocus, the controller moves the focus lens by a unit movement amount smaller than the unit movement amount of the focus lens in the focusing.

2. An image pickup apparatus according to claim 1,
   wherein the controller is configured to calculate a movement amount of the image pickup element from the position detected by the position detector to the specific position, and to restrict the movement of the image pickup element to the specific position when the calculated movement amount of the image pickup element is smaller than a first predetermined value.

3. An image pickup apparatus according to claim 2,
   wherein the controller is configured to calculate a movement amount of the focus lens for decreasing the generation of defocus, and to restrict the movement of the focus lens when the calculated movement amount of the focus lens is smaller than a second predetermined value.

4. A method for controlling an image pickup apparatus configured to move a focus lens and an image pickup element to perform focusing, the image pickup element being moved in a predetermined movable range, the method comprising:
   a step of detecting a position of the image pickup element moved for the focusing; and
   a step of moving, after the focusing, the image pickup element to a specific position closer to a center of the predetermined movable range than the detected position, and subsequently moving the focus lens so as to decrease generation of defocus due to the movement of the image pickup element to the specific position,
   wherein in a correction movement so as to decrease generation of defocus, the step of moving moves the focus lens by a unit movement amount smaller than the unit movement amount of the focus lens in the focusing.

5. An image pickup apparatus configured to move a focus lens and an image pickup element to perform focusing, the image pickup element being moved in a predetermined movable range, the image pickup apparatus comprising:
   a position detector configured to detect a position of the image pickup element moved for the focusing; and
   a controller configured to move, after an image pickup processing, the image pickup element to a specific position closer to a center of the predetermined movable range than the position detected by the position detector, and to subsequently move the focus lens so as to decrease generation of defocus due to the movement of the image pickup element to the specific position,
   wherein in a correction movement so as to decrease generation of defocus, the controller moves the focus lens by a unit movement amount smaller than the unit movement amount of the focus lens in the focusing.

6. A method for controlling an image pickup apparatus configured to move a focus lens and an image pickup element to perform focusing, the image pickup element being moved in a predetermined movable range, the method comprising:
   a step of detecting a position of the image pickup element moved for the focusing; and
   a step of moving, after an image pickup processing, the image pickup element to a specific position closer to a center of the predetermined movable range than the detected position, and subsequently moving the focus lens so as to decrease generation of defocus due to the movement of the image pickup element to the specific position,
   wherein in a correction movement so as to decrease generation of defocus, the step of moving moves the focus lens by a unit movement amount smaller than the unit movement amount of the focus lens in the focusing.

* * * * *